(No Model.)
H. ROBISON.
TRACE CARRIER.
No. 413,868. Patented Oct. 29, 1889.
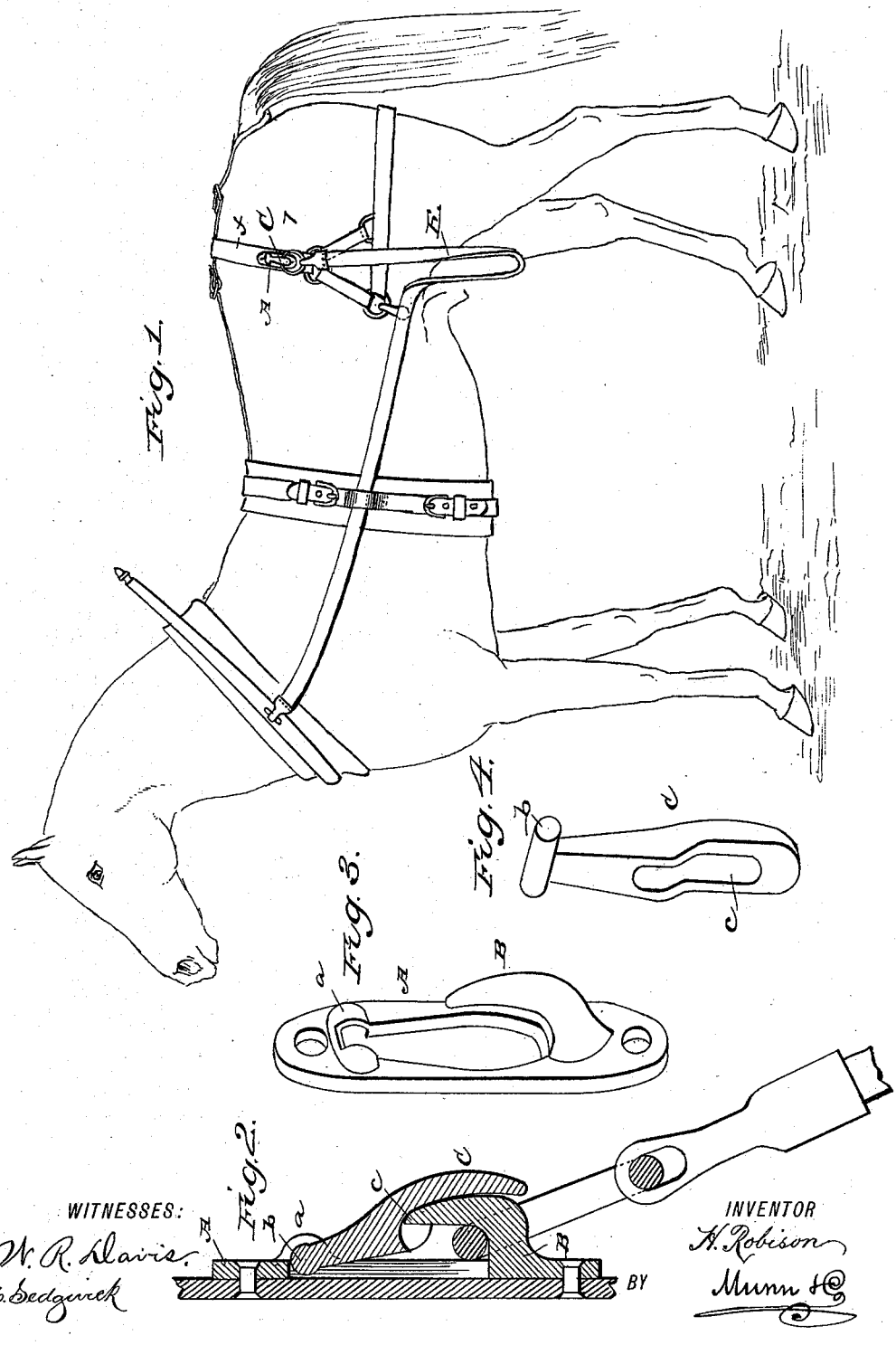
WITNESSES:
W. R. Davis
C. Sedgwick
INVENTOR
H. Robison
BY
Munn & Co.
ATTORNEY

United States Patent Office.

HIRAM ROBISON, OF GARWOOD, PENNSYLVANIA.

TRACE-CARRIER.

SPECIFICATION forming part of Letters Patent No. 413,868, dated October 29, 1889.

Application filed March 19, 1889. Serial No. 303,912. (No model.)

*To all whom it may concern:*

Be it known that I, HIRAM ROBISON, of Garwood, in the county of Washington and State of Pennsylvania, have invented a new and Improved Trace-Supporter, of which the following is a specification, reference being had to the annexed drawings, forming a part thereof, in which—

Figure 1 is a perspective view of a portion of a harness, showing the application of my improved trace-holder. Fig. 2 is a vertical section of the trace-holder. Fig. 3 is a perspective view of the base-plate and hook, and Fig. 4 is a perspective view of the tongue for covering the hook of the trace-holder.

Similar letters of reference indicate corresponding parts in all the views.

The object of my invention is to provide a simple and effective device for supporting the traces of a harness for convenience in harnessing the horse, and also to prevent the trace from trailing when the horse is detached from the vehicle.

The invention consists in the peculiar construction and arrangement of parts, as hereinafter fully described, and pointed out in the claim.

The base-plate A of the trace-support is provided with a hook B, projecting outward and upward. It is also furnished with a socket $a$ for receiving the T-shaped end $b$ of the tongue C, the said tongue being enlarged and rounded on its outer surface and provided with a recess $c$ in its inner surface for inclosing the point of the hook B.

The base-plate A is attached to the hip-strap $f$ by rivets or in any other suitable manner.

The eye of the trace E is placed in the holder by lifting the tongue C and dropping the eye into the hook B, afterward allowing the tongue C to drop down over the hook and over the eye, thereby holding it securely in its place. The rounded tongue C prevents the hook B from injuring the horse.

Having thus described my invention, I claim as new and desire to secure by Letters Patent—

As an improved article of manufacture, a trace-support consisting of the apertured plate A, provided with the outwardly and upwardly projecting hook B and with the socket $a$ above the hook, and the tongue C, having a rounded outer surface and provided with the T-shaped end $b$ to enter the socket and the recess $c$ in its inner surface for inclosing the point of the hook, as specified.

HIRAM ROBISON.

Witnesses:
ELMER E. SPROWLS,
LAURA SPROWLS.